Patented Dec. 19, 1939

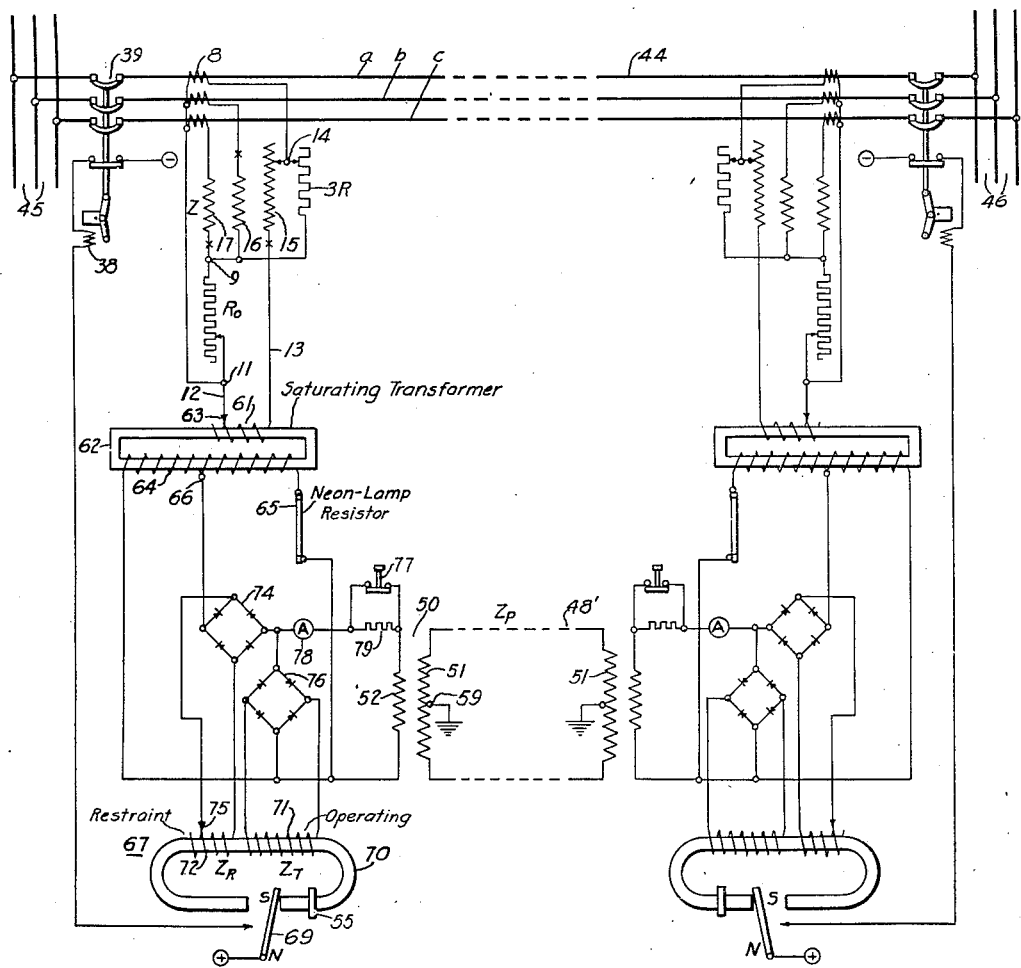

2,183,537

UNITED STATES PATENT OFFICE 2,183,537

PILOT WIRE RELAYING

Myron A. Bostwick, Budd Lake, N. J., assignor to Westinghouse Electric & Manufacturing Company, East Pittsburgh, Pa., a corporation of Pennsylvania Application January 3, 1938, Serial No. 182,980

9 Claims. (Cl. 175—294)

My invention relates generally to relaying systems for the protection of transmission lines or other electrical devices in the event of a fault, and it has more particular relation to a voltage-limiting combination which has the property of limiting the magnitude of a voltage-vector, while substantially preserving the sinusoidal wave-form thereof, so that the phase-angular relations are not disturbed by the harmonics which are produced in a distorted wave-form. This combination was particularly designed for differential protective means for transmission lines or other electrical devices, but it is obviously of general utility for other combinations.

In its relation to differential protective systems, my invention is an improvement over the relaying apparatus which is described and claimed in an application of E. L. Harder, filed concurrently herewith, Serial No. 183,044, filed January 3, 1938.

A more specific object of my invention is to provide a combination of a saturating transformer or reactor, and a neon lamp or other space-current discharge-device, particularly a gaseous discharge-device, for limiting the magnitude, without materially distorting the sinusoidal wave-form, of a variable alternating voltage.

A further object of my invention is to provide a differential protective system for electrical apparatus, involving a totalization of currents entering and leaving the apparatus, and further involving the use of my novel voltage-limiting means in the energization of a fault-responsive relay, and particularly in the energization of a differential fault-responsive relay of a type having separate operating and restraining coils or circuits. In this system, the currents at one end are supplied through one of my novel voltage-limiting means, and the currents at the other end are supplied through another of my novel voltage-limiting means. By making the limiting voltage less than the voltage corresponding to fault-conditions, I convert the differential fault-responsive relay into a directionally responsive relay, which is responsive practically solely to the relative directions of the input- and output-currents in the protected apparatus.

With the foregoing and other objects in view, my invention consists in circuits, instrumentalities, systems, combinations and methods hereinafter described and claimed, and illustrated in the accompanying drawing, the single figure of which is a diagrammatic view of circuits and apparatus showing my invention as applied in the differential protection of a transmission line or other electrical device having input and output ends.

The illustrated embodiment of my invention makes use of a special phase-sequence network which responds, with differently weighted responses, to the positive-sequence line-current $I_1$ of a three-phase line $a$, $b$, $c$ and to the zero-sequence current $I_0$, without responding to the negative-sequence component $I_2$. As explained in the aforesaid Harder application, such a dual network may be obtained from any of the known positive-sequence networks by adding an impedance, such as the subsequently described resistances $R+R_0$, traversed by the neutral current $3I_0 = I_a + I_b + I_c$.

An exemplary embodiment of such a sequence-network is shown in the accompanying drawing, in which the phase-$a$ current $I_a$ is supplied by a current-transformer 8, and is passed through a resistor $3R$, and thence to the neutral-point 9. The phase-$b$ current $I_b$ is passed through the winding 16 of a three-winding reactor Z, having three windings 15, 16 and 17, with the reactance $$j\sqrt{3}R$$

between the winding 15 and each of the other two windings. The phase-$c$ current is passed through the reactor-winding 17 in the opposite direction, as indicated by the polarity-marks $x$. After passing through the windings 16 and 17, the currents $I_b$ and $I_c$ are led to the neutral-point 9, and the neutral current $3I_0$ flows from thence, through a resistor $R_0$, to the neutral return-conductor 11.

One terminal 12 of the measuring circuit or output-circuit of the network is connected to the neutral conductor 11, and the other measuring-circuit terminal 13 is connected to the input-terminal 14 of $3R$, through the reactor-winding 15. Such a network or phase-sequence filter operates as a source of voltage $E'_m$ in series with an internal network-impedance $Z_F$, as determined by the following equations:

$$E'_m = 6R\left(I_1 + \frac{R+R_0}{2R}I_0\right) \quad \text{(1)}$$

and $$Z_F = Z + 3R + R_0 \quad \text{(2)}$$

In the drawing, I illustrate my invention in a ratio-differential, circulating-current protective-relay system for a 3-phase line-section 44 to be protected. The protected line-section extends between the buses 45 and 46 in different substations. The relaying equipments of the two ends of the line-section are identical, so that a description of one will suffice for both. Each end of the line-section has a circuit breaker 39 having a trip-coil 38, the energization of the trip-coil being controlled by a polarized relay 67.

In this system, a filter-network, as hereinabove described, is provided at each end of the line-section, and the output of each filter-network, from the leads 12 and 13, is fed into the low-voltage winding 61 of a saturating transformer 62, the number of turns of this low-voltage winding being adjustable as indicated at 63. This saturating transformer 62 has a high-voltage winding 64 which energizes a neon-lamp resistor 65, or other equivalent non-linear resistance-device having the property of drawing current only at the peak of an alternating voltage-wave. The high-voltage winding 64 of the saturating transformer 62 is also provided with a tapped point 66 which energizes a differential polarized relay 67 in a manner which will subsequently be described.

The differential polarized relay 67 is symbolically represented, as if its movable armature 69 is a permanent polarizing magnet, as indicated by the north and south poles N, S. It also has a stationary core 70 which carries an operating or tripping coil 71 and a restraining coil 72. This polarized relay 67 may be of any desired type, preferably that which is shown and described in a Lenehan and Rogers application, Serial No. 114,964, filed December 9, 1936.

The output of the tapped point 66 of the saturating transformer 62 is supplied to the low-voltage winding 52 of an insulating transformer 50, through one diagonal of a serially connected rectifier-bridge 74, the other diagonal of which supplies the restraining coil 72 with rectified current. Provision is usually made for adjusting the number of turns of the restraining winding 72, as indicated at 75. Across the terminals of the low-voltage winding 52 of the insulating transformer 50, is connected the input-diagonal of another rectifier-bridge 76, the output-diagonal of which supplies the tripping or operating coil 71 with rectified voltage.

The high-voltage winding 51 of the insulating transformer 50 at one end of the protected line-section is connected to the corresponding high-voltage winding 51 at the other end, by means of pilot-wires 48'. Thus, the system is so arranged that, during normal or "through"-current conditions, the two measuring-circuit voltages E'm of the networks at the two ends of the line are additive, causing a current to normally circulate in the pilot-wires 48' during through-current conditions when the same current which enters the line-section at one end leaves it at the other end.

The insulating transformer 50 preferably has the mid-point of its high-voltage winding 51 grounded, as indicated at 59.

The design is such that the equivalent impedance $Z_P$ of the pilot-wires is negligibly small, as compared with the sum of the equivalent impedance $Z_R$ of the restraining coil 72 plus the equivalent impedance $Z_F$ of the filter-network, so that, under normal through-current conditions, the impedance-drop of the circulating current in the pilot-wire impedance $Z_P$ is substantially zero, practically all of the impressed voltage being consumed in the remaining portions of the circuit $(Z_R+Z_F)$. The equivalent impedance $Z_P$ of the pilot-wires takes into consideration the transformation-ratios of the two transformers 62 and 50, and may be made to include also the impedance of the insulating transformer 50. The impedance $Z_R$ of the restraining coil 72 takes into consideration the transformation-ratio of the saturating transformer 62, and it also includes the impedances of said transformer 62 and the rectifier-bridge 74.

From an inspection of the drawing, it will be obvious that the impedance-drop in the pilot-wire impedance $Z_P$ determines the voltage which appears across the low-voltage winding 52 of the transformer 50, which, in turn, is the same as the voltage impressed upon the tripping or operating coil 71 through the rectifier 76. Since this $Z_P$ impedance-drop is substantially zero, under normal through-current conditions, the operating coil 71 is thus normally deenergized and the relay is prevented from operating.

When a fault occurs within the protected line-section 44, the operating coil 71 is energized proportionately to the magnitude of the fault-current, while the restraining coil 72 is energized approximately proportionately to the "through" current-component corresponding to whatever load-current is carried by the system at the time of fault.

The speed of operation of the polarized relays 67 is preferably held back by means of a short-circuited coil 55 or its equivalent.

In the drawing, I show means for periodically testing the pilot-wires 48' by means of a pushbutton 77 and an ammeter 78. The ammeter 78 is connected in circuit with the low-voltage coil 52 of the insulating transformer 50, in series with a resistance 79 which is normally short-circuited by the pushbutton 77. When the pushbutton 77 is depressed, it removes the short-circuit from the resistance 79, and the change in the reading of the ammeter 77 will indicate whether the pilot-wires 48' are shorted, grounded or open-circuited, or whether they are in sound operative condition.

If the pilot-wire open-circuits, there will be substantially no current in the restraint-coil 72 of the relay, and the relay will operate as a simple overcurrent relay, causing tripping at any point in the line, where fault-current of sufficient magnitude is fed into the line-section, regardless of whether the fault is internal or external. If the pilot-wires 48' should become short-circuited, the operating coil 71 of each relay would be, in effect, short-circuited, and the relay could never operate, so that it is necessary to guard against such a condition by sufficiently frequent periodic checks on the pilot-wire by means of the pushbutton 77.

In the subsequent theory of utilization-circuits and relay-characteristics, the line-current will be generalized into a single current, $$I_s = I_{ls} + kI_{os} \tag{3}$$

entering the sending end, and another current, $$I_r = I_{lr} + kI_{or} \tag{4}$$

leaving the receiving end of the protected line-section. The terms "sending" and "receiving" are simply convenient names, and are not intended to imply a particular power-direction. It will be understood that $I_{ls}$ and $I_{lr}$ are the positive-sequence components of the sending and receiving currents $I_s$ and $I_r$, respectively, and that the $I_{os}$ and $I_{or}$ are the corresponding zero-sequence current-components. The fault-current is then $$I_f = I_s - I_r \tag{5}$$

The measuring-circuit voltages $E'_m$ of the phase-sequence filter-networks at the two ends of the line-section will be proportional to the currents $I_s$ and $I_r$, respectively. Distinguishing these two measuring-voltages by adding the subscripts $s$ and $r$ to distinguish between the sending and receiving ends, we may write $$E'_{ms} = CI_s \text{ and } E'_{mr} = CI_r \quad\quad\quad (6)$$

$C$ being a constant.

The voltages $E'_{ms}$ and $E'_{mr}$ normally act in series with each other, to circulate a restraint-current proportional to the load-current which is transmitted through the line-section. The voltage between the pilot-wires, at a point midway between the two stations, is zero; and if the pilot-wire impedance $Z_P$ is made relatively small compared with $(Z_R + Z_F)$, there is a negligible voltage across the operating-coil impedance $Z_T$ (corresponding to the rectifier 76 and the coil 71). Under these conditions, through-current produces current only in the restraining-coil impedance $Z_R$ (corresponding to the rectifier 74 and the coil 72).

If equal currents flow into the line-section, from the two ends thereof, feeding a fault within the line-section, the network voltages $E'_{ms}$ and $E'_{mr}$ will be equal and opposed, assuming no "through"-current flowing at the time of fault. Under these conditions, no current will circulate over the pilot-wires. The current in each restraining coil 72 will necessarily, however, be exactly equal to the current in its corresponding operating coil 71 at that end of the line-section, for this condition of an internal fault without any through-current. My differential relay 67 is so designed, however, that it has a very large number of turns in the operating coil, as compared with the number of turns in the restraining coil, so that the relay is very sensitive to fault-currents, and is strongly energized by such currents, thereby providing a positive operating differential in the relay. In a preferred form of embodiment of my invention, I have successfully utilized 4,000 turns in the operating coil 71, and from 200 to 500 turns in different taps of the restraining coil 72, although I am obviously not limited to these precise proportions.

In the differential polarized relay 67, there are three forces which act on the relay according to the following equation:

Operating coil = restraining coil + spring and magnetic bias, or $$C_T|I_s - I_r| = C_R|I_s + I_r| + B \quad\quad\quad (7)$$

Absolute values are designated by the use of a horizontal bar over a symbol, or by the use of vertical bars instead of parentheses. The absolute values are effective, due to the rectification of the quantities for use in energizing the coils.

The differential relay 67 operates, therefore, whenever the fault-current magnitude $$\overline{I_f} = |I_s - I_r|$$

exceeds a fixed proportion of the average through-current, $$\frac{1}{2}|I_s + I_r|$$

plus a constant. This characteristic is a circle having a diameter equal to $$\frac{C_R}{C_T}|I_s + I_r| + \frac{B}{C_T}$$

The vectors $I_s$ and $I_r$ terminate on the circle at opposite ends of any diameter. Tests and theory also indicate that the tripping locus of $I_r$ lies on a circle. This characteristic is the same as has been utilized heretofore in the ratio-differential protection of generators and transformers. When both the through-current and the fault-current become very large (or when the relay is made extremely sensitive by reducing its fixed restraint $B$), the two variable terms of Equation 7 become large compared with $B$, so that $B$ becomes negligibly small. The tripping point then approaches the pure ratio:

$$\overline{I_f} = \frac{C_R}{C_T}|I_s + I_r| \quad\quad\quad (8)$$

The foregoing explanation applies to the diagram as shown in the drawing, without the addition of the voltage-limiting devices comprising the saturating characteristic of the saturating transformer 62 and the non-linear characteristic of the neon-lamp resistance 65. If the filter-outputs are subjected to such voltage-limiting devices, before being applied to the pilot wire and to the relay-circuit combination, the characteristics of the resulting network may be understood by consideration of the limiting value of voltage.

In various electrical circuits, it has often been desirable to limit the amount of energy in a particular part of the circuit during overload conditions. When saturating transformers or reactors have been included in the circuit for bringing about this limitation, a flat-topped flux-wave has been produced, which, in turn, causes a very sharply peaked voltage-wave. The peak in the output-wave of a saturated transformer is not a symmetrical peak, but is considerably displaced from the midpoints of the half-waves.

In the relay-system which is shown in the drawing, where the output of the saturating transformer 62 is compared with the output of a corresponding saturating transformer at the other end of the line-section or other differentially protected device, the effect of the peaked voltage-wave would be to introduce harmonics, which would distort the phase-angle effects between the compared currents at the two ends of the line or other differentially protected electrical device.

To eliminate this difficulty, a gaseous-conduction device, such as a neon lamp, has been added, in accordance with my invention. Since the neon lamp is essentially a high-voltage apparatus, it is usually desirable to provide enough turns on the high-voltage side of the saturating transformer 62 to accommodate a neon lamp of commercial design. The effect of the neon lamp is to add no burden during the low-voltage conditions of the voltage-wave, and to draw sufficient current, after the glow-discharge has started, to limit the peak of the voltage-wave, that is, to cut off the sharp, unsymmetrical peak in the output-wave of the saturated transformer. Thus, by combining the wave-distorting effects of the saturating transformer and the neon lamp, the output wave-form may be adjusted to a definitely flat-topped, but approximately sine-wave, form.

In the illustrated embodiment of my invention, therefore, to take into consideration the voltage-limiting effect of the saturating transformer 62 and the neon lamp 65, it may be assumed that the currents $I_r$ and $I_s$ do not exceed a constant limiting value $$\overline{I_s}$$

It may be further assumed that, as the actual line-currents increase beyond these limiting values, their corresponding measuring-circuit quantities will retain their relative phase-angle $\varphi$, but will not increase in value, so far as the relaying-circuit responses are concerned. We may write, therefore, $$I_s = \bar{I}_s \text{ and } I_r = \bar{I}_s \epsilon^{i\varphi} \qquad (9)$$

Substituting these values in Equation 7, we obtain $$|1 - \epsilon^{i\varphi}| - \frac{C_R}{C_T}|1 + \epsilon^{i\varphi}| = \frac{B}{\bar{I}_s C_T}, \text{ a constant} \quad (10)$$

The balance-point of the relay thus depends solely upon the phase-angle $\varphi$ between the two currents $I_r$ and $I_s$, and the relay has pure directional characteristics, being dependent solely upon the relative directions of the currents at the sending and receiving ends.

If $$\frac{C_R}{C_T}$$

is unity and $$\frac{B}{\bar{I}_s}$$

is negligibly small or zero, Equation 10 is satisfied for $\varphi = \pm 90°$, and the relay would trip, with large line-currents, only when $I_r$ is over 90° out of phase with $I_s$, either leading or lagging. For other values of the constants, other angular limits are established, between $I_s$ and $I_r$, as the threshold of tripping.

An important characteristic of the relay with the phase-preserving voltage-limiting devices is that the relay becomes substantially a polarized directional element, for all current-magnitudes which are large enough to saturate the transformer. Such a relay, in combination with the pilot-wire circuit, compares the current-directions at the two ends of the line. It can be readily applied to practically any system, without regard to nicely matching the current-transformers at the two ends of the line or other differentially protected electrical apparatus. In other words, such a relay permits large ratio-inaccuracies in the current-transformers, without producing faulty tripping on heavy through-currents such as are obtained when a fault occurs outside of the protected line-section. At the same time, the relay still maintains a sensitive protective operation for internal faults, or faults occurring within the line-section or protected apparatus.

While I have illustrated my invention in a single preferred form of embodiment, I desire it to be understood that such illustration is intended only by way of example, and not by way of limitation, as it will be obvious, to those skilled in the art, that many modifications in precise details of embodiment may be adopted without departing from the broader features of my invention. I desire, therefore, that the appended claims shall be accorded the broadest interpretation consistent with their language and the prior art.

I claim as my invention:

1. A voltage-transforming device comprising means for providing an input-circuit subjected to a variable alternating voltage, means for providing an output-circuit for supplying an altered voltage, and voltage-modifying means for connecting said input- and output-circuits, said voltage-modifying means comprising a saturating inductance device for producing, from said input-voltage, a peaked voltage-wave of limited magnitude, in combination with a parallel-connected space-current discharge-device for reducing the peak in the output voltage-wave.

2. A differential-protection apparatus for an alternating-current electrical device having input and output terminals, comprising current-responsive means associated with each terminal for deriving a current-responsive alternating voltage, a voltage-transforming device associated with each current-responsive derived voltage for providing an output-circuit for supplying an altered voltage, each voltage-transforming device having voltage-modifying means comprising a saturating inductance device for producing, from its associated current-responsive derived voltage, a peaked voltage-wave of limited magnitude, in combination with a parallel-connected space-current discharge-device for reducing the peak in the output voltage-wave, means for vectorially combining said output voltage-waves which are obtained from the respective terminals of said electrical device to be protected, and a protective-relay device energized from said vectorially combined voltage-waves.

3. The invention as defined in claim 2, characterized by said protective-relay device comprising a differential relay having a relay-operating circuit responsive to fault-currents flowing into the protected electrical device from both terminals thereof, and a relay-restraining circuit responsive, in some measure, to through-currents flowing into the protected electrical device at the input-terminal and out of the protected electrical device at the output-terminal.

4. A differential-protection apparatus for an alternating-current electrical device having input and output terminals, comprising current-responsive means associated with each terminal for deriving a current-responsive alternating voltage, a voltage-transforming device associated with each current-responsive derived voltage for providing an output-circuit for supplying an alternating output-voltage of limited magnitude, of approximately sinusoidal wave-form, and of a phase corresponding substantially to the phase of the current in the associated terminal of the protected electrical device, a polarized relay having a relay-operating circuit and a relay-restraining circuit, means for vectorially combining the aforesaid output-voltages, which are obtained from the respective terminals of the protected electrical device, into a single alternating quantity responsive to fault-currents flowing into the protected electrical device from both terminals thereof, means associated with at least one of said output-voltages for providing another alternating quantity which is responsive, in some measure, to through-currents flowing into the protected electrical device at the input-terminal and out of the protected electrical device at the output-terminal, means for deriving a separate rectified current from each of said alternating quantities, and means for supplying said rectified currents respectively to the relay-operating circuit and the relay-restraining circuit of said polarized relay.

5. A differential-protection apparatus for an alternating-current electrical device having input and output terminals, comprising current-responsive means associated with each terminal for deriving a current-responsive alternating voltage, a voltage-transforming device associated with each current-responsive derived voltage for providing an output-circuit for supplying an alternating output-voltage of limited magnitude, of approximately sinusoidal wave-form, and of a phase corresponding substantially to the phase of the current in the associated terminal of the protected electrical device, a polarized relay having a relay-operating circuit and a relay-restraining circuit, means for vectorially combining the aforesaid output-voltages, which are obtained from the respective terminals of the protected electrical device, into a single alternating quantity responsive to fault-currents flowing into the protected electrical device from both terminals thereof, means for vectorially combining said output-voltages into another alternating quantity responsive to through-currents flowing into the protected electrical device at the input-terminal and out of the protected electrical device at the output-terminal, means for deriving a separate rectified current from each of said alternating quantities, and means for supplying said rectified currents respectively to the relay-operating circuit and the relay-restraining circuit of said polarized relay.

6. A single-phase differential protective apparatus for a polyphase electrical device having input and output terminals, comprising a selective-phase-sequence current-responsive filter-means associated with each terminal of the protected electrical device for deriving a single-phase voltage responsive to the polyphase currents in its associated terminal of the protected electrical device, a voltage-transforming device associated with each current-responsive derived voltage for providing an output-circuit for supplying an alternating output-voltage of limited magnitude, of approximately sinusoidal wave-form, and of a phase corresponding substantially to the phase of its associated current-responsive derived voltage, means for vectorially combining said output-voltages which are obtained from the respective terminals of the protected electrical device, and a single-phase protective-relay device energized from said vectorially combined output-voltages.

7. The invention as defined in claim 4, characterized by each voltage-transforming device having voltage-modifying means comprising a saturating inductance device for producing, from its associated current-responsive derived voltage, a peaked voltage-wave of limited magnitude, in combination with a parallel-connected space-current discharge-device for reducing the peak in the output voltage-wave.

8. The invention as defined in claim 5, characterized by each voltage-transforming device having voltage-modifying means comprising a saturating inductance device for producing, from its associated current-responsive derived voltage, a peaked voltage-wave of limited magnitude, in combination with a parallel-connected space-current discharge-device for reducing the peak in the output voltage-wave.

9. The invention as defined in claim 6, characterized by each voltage-transforming device having voltage-modifying means comprising a saturating inductance device for producing, from its associated current-responsive derived voltage, a peaked voltage-wave of limited magnitude, in combination with a parallel-connected space-current discharge-device for reducing the peak in the output voltage-wave.

MYRON A. BOSTWICK.